United States Patent [19]
Deemer

[11] Patent Number: 5,455,088
[45] Date of Patent: Oct. 3, 1995

[54] PREFORM FOR CONTINUOUS STANDING RING BOTTLE

[75] Inventor: David A. Deemer, Douglasville, Ga.

[73] Assignee: Constar Plastics Inc., Atlanta, Ga.

[21] Appl. No.: 250,101

[22] Filed: May 26, 1994

Related U.S. Application Data

[63] Continuation of Ser. No. 813,953, Dec. 24, 1991, abandoned.

[51] Int. Cl.$^6$ ................................................. B29B 11/00
[52] U.S. Cl. .................. 428/35.7; 428/36.92; 428/542.8
[58] Field of Search ......................... 428/36.92, 35.7, 428/36.7, 542.8, 213; 215/1 C

[56] References Cited

U.S. PATENT DOCUMENTS

| | | | |
|---|---|---|---|
| 4,108,324 | 8/1978 | Krishnakumar et al. | 215/1 C |
| 4,261,948 | 4/1981 | Krishnakumar et al. | 264/532 |
| 4,334,627 | 6/1982 | Krishnakumar et al. | 215/1 C |
| 4,403,706 | 9/1983 | Mahajan | 215/1 C |
| 4,603,831 | 8/1986 | Krishnakumar et al. | 249/144 |
| 4,725,464 | 2/1988 | Collette | 428/35 |
| 4,780,257 | 10/1988 | Beck | 264/40.1 |
| 4,785,948 | 11/1988 | Strassheimer | 215/1 C |
| 4,889,752 | 12/1989 | Beck | 428/36.92 |
| 4,927,679 | 5/1990 | Beck | 428/36.92 |
| 4,950,514 | 8/1990 | Strassheimer | 428/36.92 |
| 4,977,005 | 12/1990 | Krishnakumar et al. | 428/36.92 |
| 4,997,692 | 3/1991 | Yoshino | 428/36.92 |
| 5,116,565 | 5/1992 | Yoshino | 264/532 |

*Primary Examiner*—Charles R. Nold
*Attorney, Agent, or Firm*—Locke Reynolds

[57] ABSTRACT

A plastic bottle having a neck portion defining an opening, a generally tubular bottle body portion depending from the neck portion, and an integral bottle bottom structure closing a lowermost end of the bottle body portion including a continuous standing ring circumscribing a central push-up region is blow molded from a preform which includes a generally tubular preform body portion having an outside wall face and an inside wall face and an integral preform bottom structure closing a lowermost end of the preform. The preform body includes a cylindrical thickened portion which upon blowing forms said continuous standing ring. The central push-up region of the plastic bottle is formed from that portion of the preform below the cylindrical thickened portion. The portion of the preform below the cylindrical thickened portion includes features contributing to enhanced bottle bottom strength while minimizing the amount of resin employed in the structure.

14 Claims, 3 Drawing Sheets

PREFORM FOR CONTINUOUS STANDING RING BOTTLE

This application is a continuation of 07/813,953 filed Dec. 24, 1991 now abandoned.

BACKGROUND OF THE INVENTION

This invention relates generally to a preform for forming a blow molded plastic bottle having an integral champagne base including a continuous standing ring circumscribing a central push-up region. More particularly, this invention focuses on diminishing the total mass of plastic necessary to form such a bottle while retaining the strength necessary in the bottom to prevent eversion of the base due to internal pressure within the bottle.

Blow molded plastic bottles having champagne-style bases for containing carbonated beverages and the like are well-known. Various features have been adopted in the past in order to enhance the strength of the base so as to resist the internal pressure caused by the carbonated beverage against the bottom tending to invert the central push-up region of the champagne base. One solution to resisting the inverting pressure has been the use of a large amount of resin in the base thereby making the base inflexible even under high internal pressure. This solution is cost-prohibitive for a non-return beverage bottle.

Another solution has been the use of radial ribs positioned on the inside of the push-up portion of the base and extending radially outward through the standing ring portion to merge with the outer sidewall of the bottle. An example of such a structure is shown in Krishnakumar, et al., U.S. Pat. Nos. 4,261,948 and 4,334,627. The formation of the interior ribs was achieved by forming axially elongated ribs on the interior of the preform which ribs were displaced from the preform molded position radially outward to the final position radially crossing the standing ring portion of the bottle.

Mahajan, U.S. Pat. No. 4,403,706 disclosed a further improvement in preform design which provided for hollow ribs to be formed which were restricted to the standing ring portion of the container so as to add stiffness to the standing ring potion. The hollow ribs of Mahajan were said to be as strong as the solid ribs of Krishnakumar yet use a reduced amount of resin.

Beck, U.S. Pat. Nos. 4,780,257; 4,889,752; and 4,927,679 sought to enhance the strength of the standing ring portion of the bottle by producing an annular ring in the preform which was displaced outward and became resident in the standing ring portion, thereby enhancing the strength of that portion. Generally the amount of resin employed in the Beck design diminished gradually as one moved inward from the standing ring to a ring surrounding a small central region where the thickness again increased.

While each of the structures have provided for enhanced strength of the champagne base, the more recent trend toward thin-walling of containers so as to minimize the amount of resin employed to make a bottle has added emphasis to the fact that the portion of the container forming the push-up region is the most vulnerable to failure. Further, the failure mode is one of eversion of the material on the inside of the standing ring portion, particularly where that standing ring portion has been thickened in accordance with the general design of the Beck patents discussed previously.

Accordingly, it is an object of the present invention to provide for enhanced strength for the push-up region of the container by permitting overall light-weighting of the container.

SUMMARY OF THE INVENTION

In accordance with the present invention, a plastic preform is provided which is employed to form a blow-molded plastic bottle, the bottle having an integral base portion including a continuous standing ring circumscribing a central push-up region. The preform itself includes a neck portion defining an opening and finish of conventional design. A generally-tubular body portion depends from the neck portion having an outside wall face and an inside wall face. An integral domed-bottom structure closes a lower most end of the tubular body portion. The generally-tubular body portion includes a thickened annular portion for forming the continuous standing ring of the bottle. The thickened annular portion is defined by a first radially inward step of the inside wall face at a first selected distance below the opening and a second radially inward step of the outside wall face at a second selected distance below the opening, the second distance being greater than the first. A plurality of circumferentially-spaced and longitudinally-extending ridges on the outside wall face are spaced regularly around the circumference of the preform immediately below the thickened annular portion for forming radially extending ribs in the central push-up region of the bottle.

In the preferred embodiment of the present invention, the inside and outside wall faces of the thickened annular portion are parallel to each other over the entire vertical extent of the thickened portion. Preferably, the inside wall face is substantially cylindrical, rather than conical, from the bottom of the first radially inward step to the integral domed bottom structure closing the lower-most end of the preform. Generally, the thickened portion has a thickness of between about 105% and 135% of the thickness of the adjacent tubular body portion. As a rule, the thickened annular portion has an axial length of from less than about 15% to as much as 30% of the length of the preform since it is desirable to enhance the thickness of only the standing ring portion but not add unnecessary mass to the container as a whole.

In the preferred embodiment, each of the inward steps defining the upper and lower boundary of the thickened annular portion comprise a downwardly and radially inwardly inclined ledge smoothly merging with the adjacent portions of the preform. In the preferred embodiment, the plurality of circumferentially-spaced and longitudinally-extending ridges on the preform comprise undulations of the outside wall face forming continuous alterations in wall thickness of regularly varying cross-section around the circumference of the preform.

One feature of the present invention is the preform's inclusion of the thickened annular portion which provides for enhanced strength in the immediate region of the standing ring but which avoids any waste of material in the push-up base region of the bottle. The push-up base region of the bottle is strengthened by ribs which are formed from the longitudinally-extending ridges situated below the annular thickened portion of the preform. The ribs are especially helpful with bottles of larger dimension, i.e., 1.5 liter and greater, where the push-up region is generally exposed to higher pressures and the angle of the push-up tends to be somewhat shallower.

The longitudinal ribs in the preform have the added advantage of providing for reduced back pressure during the injection molding cycle for the preform, thereby insuring that the thickened annular portion of the preform is completely filled and packed by the polymer forming the preform. The preferred polymer is PET (Polyethylene Terephthalate).

Other features and advantages of the present invention become apparent to those skilled in the art upon consideration of the following description of a preferred embodiment exemplifying the best mode of carrying out the invention as presently perceived. The detailed description particularly refers to the accompanying figures.

DESCRIPTION OF THE PREFERRED EMBODIMENT

Figure 1:
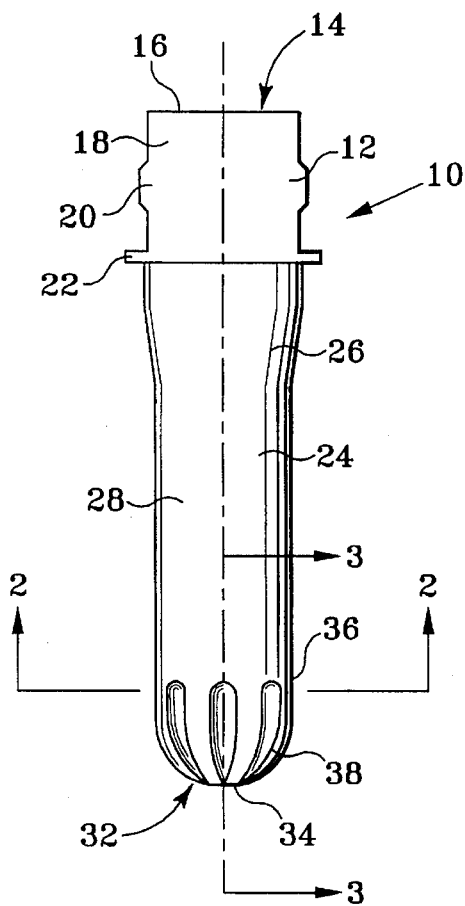
FIG. 1 is a side elevation view of a preform of the present invention.

A preform 10 in accordance with the present invention includes a neck portion 12 which defines an opening 14 at the top end 16 of the preform. The neck portion 12 includes a suitable finish 18 of conventional design adapted to receive a cap (not shown). The finish typically includes a portion 20 intended to interact with a tamper indicating band portion of the cap. At the lower end of the neck portion, a support ring 22 is provided which is employed to support the preform prior to enduring the blowing operation.

A generally-tubular body portion 24 depends from the neck portion and can include a tapered shoulder portion 26 which, in a conventional manner, is transformed during the blowing operation to a shoulder portion of the bottle between the support ring and a generally cylindrical side wall portion of the bottle. The tubular body portion 24 of the preform 10 is defined by an outside wall face 28 and an inside wall face 30 shown in greater detail in FIGS. 2–4. An integral domed bottom structure 32 closes the lower-most end 34 of the preform 10. The outside wall face 28 of the tubular body portion 24 includes a radially-inward step 36. A plurality of longitudinally-extending and circumferentially-spaced ridges 38 extend from the step 36 downward toward the lower-most end 34 of the preform 10.

Figure 2:
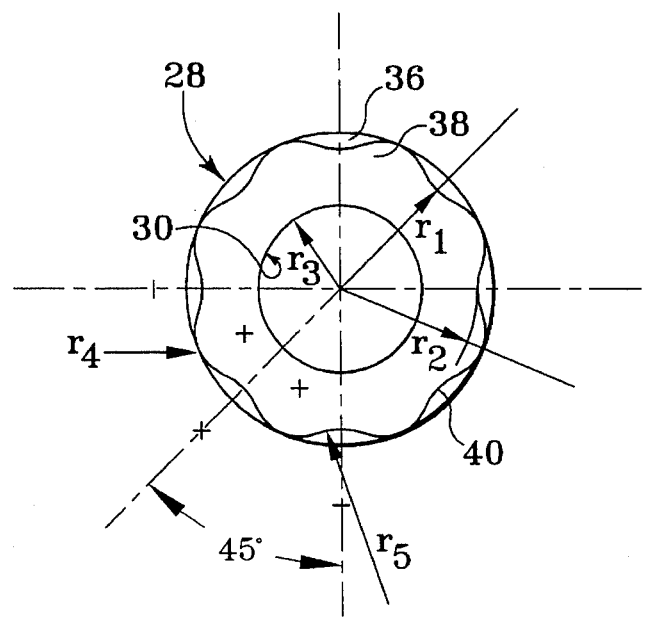
FIG. 2 is a sectional view of the preform shown in FIG. 1 taken along line 2—2.

As is seen in FIG. 2, the ridges 38 are regularly spaced around the circumference of the preform at about 45° intervals. Other intervals can be used depending upon the size of the container with fewer ridges being generally employed in smaller containers. The ridges 38 can be viewed to comprise undulations in the outside wall face 28 forming continuous alterations in wall thickness with regularly varying cross-section around the circumference of the preform 10. The undulations which form the ridges 38 act to vary the thickness of the preform by about 30%. That is, if one divides the difference between the greatest outside radius $R_1$ and the least outside radius $R_2$ which defines the height of the undulations forming the ridges 38 by the inside radius dimension $R_3$, this quotient is equal to about 0.2. The undulation radii $R_4$ and $R_5$ are a function of the total circumference of the preform and the number of ridges 38 and intervening valleys 40 existing around the circumference of the preform 10.

Figure 3:
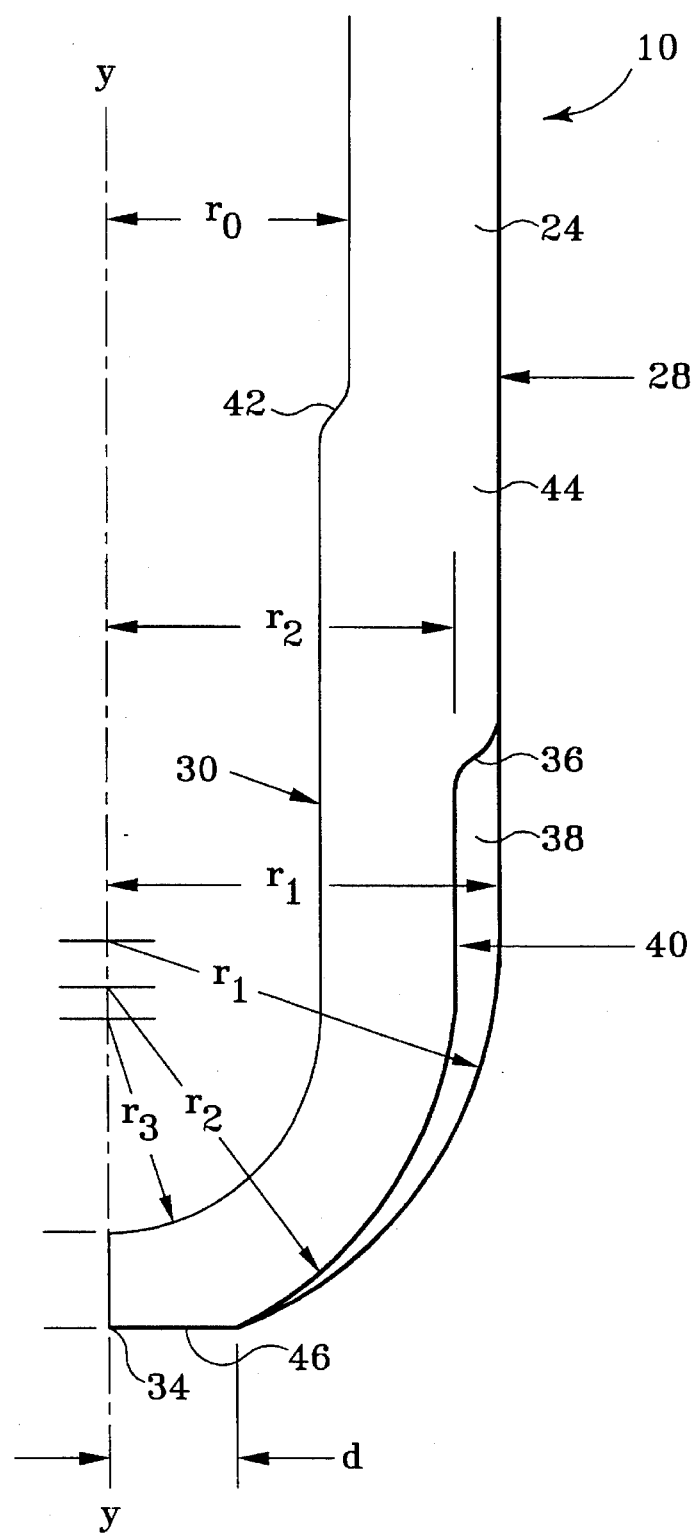
FIG. 3 is an enlarged sectional view of the lower portion of the preform shown in FIG. 1 taken along line 3—3.

In FIG. 3, it will be seen that the step 36 in the outside wall 28 is a downwardly and inwardly-inclined transition from the maximum outside radius $R_1$ to a minimum outside radius $R_2$ for the ridges 38. The step 36 is seen to be axially displaced below an inside step 42 on the inside wall face 30. The step 42 is again a radially-inward and axially-downward inclined portion where the radius of the inside wall face 30 changes from some initial $R_0$ to a new inside radius $R_3$. Between steps 36 and 42 is a thickened annular region 44 which is preferably between about 105% and 135% of the thickness of the body portion 24 at the initial inside radius $R_0$. The longitudinal extent of the thickened annular region 44 which amounts to the distance between steps 36 and 42 is generally less than about 15% of the total length of the preform as measured parallel to the axis Y—Y, but in short preforms can amount to as much as about 30% or 35% of the total length of the preform.

The integral bottom structure 32 is generally domed and shown to be defined by a series of radial curves $R_1$, $R_2$, and $R_3$. The lower-most end portion 34 includes a flattened end region 46 having a diameter generally equivalent to the diameter of the gate of the injection mold through which plastic to form the preform is injected.

Figure 4:
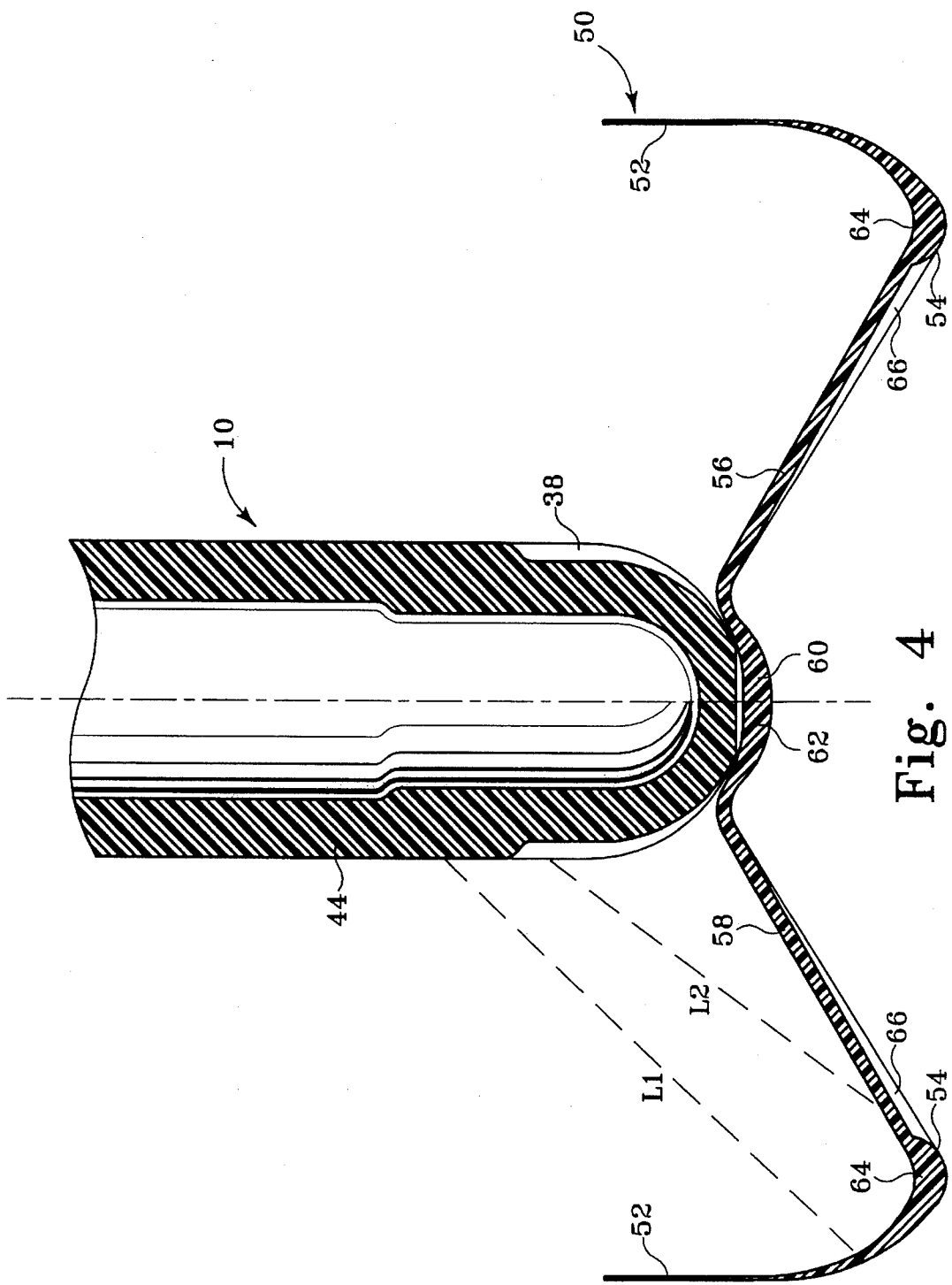
FIG. 4 is a sectional view of the lower portion of the preform shown in FIG. 1 together with a sectional view of the lower portion of a bottle blown from that preform.

FIG. 4 shows a diagramatic illustration of a preform 10 in accordance with the present invention axially centered within a blow mold for forming a bottle 50. The upper portion of the bottle is conventional and is not illustrated. The bottle 50 includes a generally-cylindrical side wall portion 52 which terminates at its lower end in a continuous standing ring 54 which circumscribes a central push-up region 56 defined by an upwardly and inwardly-inclined wall portion 58. The central portion 60 may be of any of various configurations, but is shown to include a slight downward axial projection 62. It is to be noted that the standing ring 54 includes an enhanced amount of material 64 which from projection lines $L_1$ and $L_2$ is seen to be generated by the projection of the thickened annular region 44 of the preform 10. The ridges 38 on the preform are displaced radially outwardly and downwardly during the blowing operation to form radial ridges 66 which extend at least from the inside of the standing ring 54 to a point adjacent to central region 60 of the container. FIG. 4 shows the radial ridges 66 on the left side in section and on the right side in elevated view.

Although the invention has been described in detail with reference to the illustrated preferred embodiment, variations and modifications exist within the scope and spirit of the invention as described and as defined in following claims.

What is claimed is:

1. A plastic preform for forming a blow molded plastic bottle having an integral base portion including a continuous standing ring circumscribing a central push-up region, the preform comprising:

a neck portion defining an opening, a generally tubular body portion depending from the neck portion having an outside wall face and an inside wall face, and an integral-domed bottom structure closing a lowermost end of the tubular body portion; the generally tubular body portion including a thickened annular portion having a wall thickness greater than a wall thickness for the portion of the generally tubular body adjacent to the neck portion for forming said continuous standing ring, the thickened portion being defined by a first radially inward step of the inside wall face at a first selected distance below the opening and a second radially inward step of the outside wall face at a second selected distance below the opening, a plurality of circumferentially spaced and longitudinally extending ridges defined by peaks of undulations formed by continuous alterations in wall thickness that are arranged to give the outside wall face a cross section varying approximately as a continuous sine wave, said ridges exclusively formed by the undulations on the outside wall face and spaced regularly around the outside wall circumference of the preform immediately below the thickened annular portion for forming radially extending ribs in said central push-up region of the bottle.

2. A plastic preform according to claim 1 wherein said inside and outside wall faces are parallel to each other over the vertical extent of the thickened annular portion.

3. A plastic preform according to claim 1 wherein said inside wall face being substantially cylindrical from the bottom of the first radially inward step to the domed bottom structure.

4. A plastic preform according to claim 1 wherein said thickened portion has a thickness of between about 105% and 135% of the thickness of the adjacent tubular body portion.

5. A plastic preform according to claim 1 wherein said thickened portion has a length of from less than about 15% to as much as about 35% of the length of the preform.

6. A plastic preform according to claim 1 wherein each of said inward steps comprises a downwardly and radially inwardly inclined ledge.

7. A plastic preform for forming a blow molded plastic bottle having an integral base portion including a continuous standing ring circumscribing a central push-up region, the preform comprising:

a neck portion defining an opening, a generally tubular body portion depending from the neck portion having an outside wall face and an inside wall face, and an integral bottom structure closing a lowermost end of the tubular body portion; the generally tubular body portion including a thickened portion having a wall thickness greater than a wall thickness for the portion of the generally tubular body adjacent to the neck portion for forming said continuous standing ring, the thickened portion being defined by a first radially inward step of the inside wall face at a first selected distance below the opening and a second radially inward step of the outside wall face at a second selected distance below the opening, the outside wall face below the second radially inward step having a plurality of circumferentially spaced and longitudinally extending undulations having approximately a sine wave cross section exclusively on said outside wall face, the undulations forming continuous alterations in wall thickness with regularly varying cross-section around the circumference thereof and extending onto said bottom structure for forming radially extending ribs in said central push-up region of the bottle.

8. A plastic preform according to claim 7 wherein said integral bottom structure closing a lowermost end of the tubular body portion comprises a downwardly projecting dome of constant internal radius.

9. A plastic preform according to claim 8 wherein said inside wall face being substantially cylindrical from the bottom of the first radially inward step to the domed bottom structure.

10. A plastic preform according to claim 9 wherein said thickened portion has a length of less than the length of said longitudinally extending undulations.

11. A plastic preform according to claim 10 wherein each of said inward steps comprises a downwardly and radially inwardly inclined ledge.

12. A plastic preform according to claim 11 wherein said thickened portion has a thickness of between about 105% and 135% of the thickness of the adjacent tubular body portion.

13. A plastic preform according to claim 12 wherein said thickened portion has a length of less than about 15% to as much as about 35% of the length of the preform.

14. A plastic preform for forming a blow molded plastic bottle having an integral base portion including a continuous standing ring circumscribing a central push-up region, the preform comprising:

a neck portion defining an opening; a generally tubular body portion depending from the neck portion having an outside wall face and an inside wall face, with a first predetermined wall thickness proximal to the neck portion and a second predetermined wall thickness greater than said first predetermined wall thickness, the second predetermined wall thickness located distal to the neck portion to define a thickened portion, the thickened portion being configured to form said continuous standing ring, the thickened portion being defined by a first downwardly and radially inwardly inclined ledge on the inside wall face at a first selected distance below the opening and a second downwardly and radially inwardly inclined ledge on the outside wall face at a second selected distance below the opening; and an integral bottom structure extending from the second radially inwardly inclined ledge to a lowermost end of the preform and including a downwardly projecting dome of constant internal radius, the inside wall face being substantially cylindrical from the bottom of the first radially inwardly inclined ledge to the domed bottom structure, the outside wall face of the integral bottom structure having a plurality of circumferentially spaced and longitudinally extending undulations exclusively on said outside wall face, the undulations forming continuous alterations in wall thickness with a regularly varying approximately sine wave cross-section around the circumference thereof for forming radially extending ribs from the peaks of the undulations in said central push-up region of the bottle.

* * * * *